Figure 1:
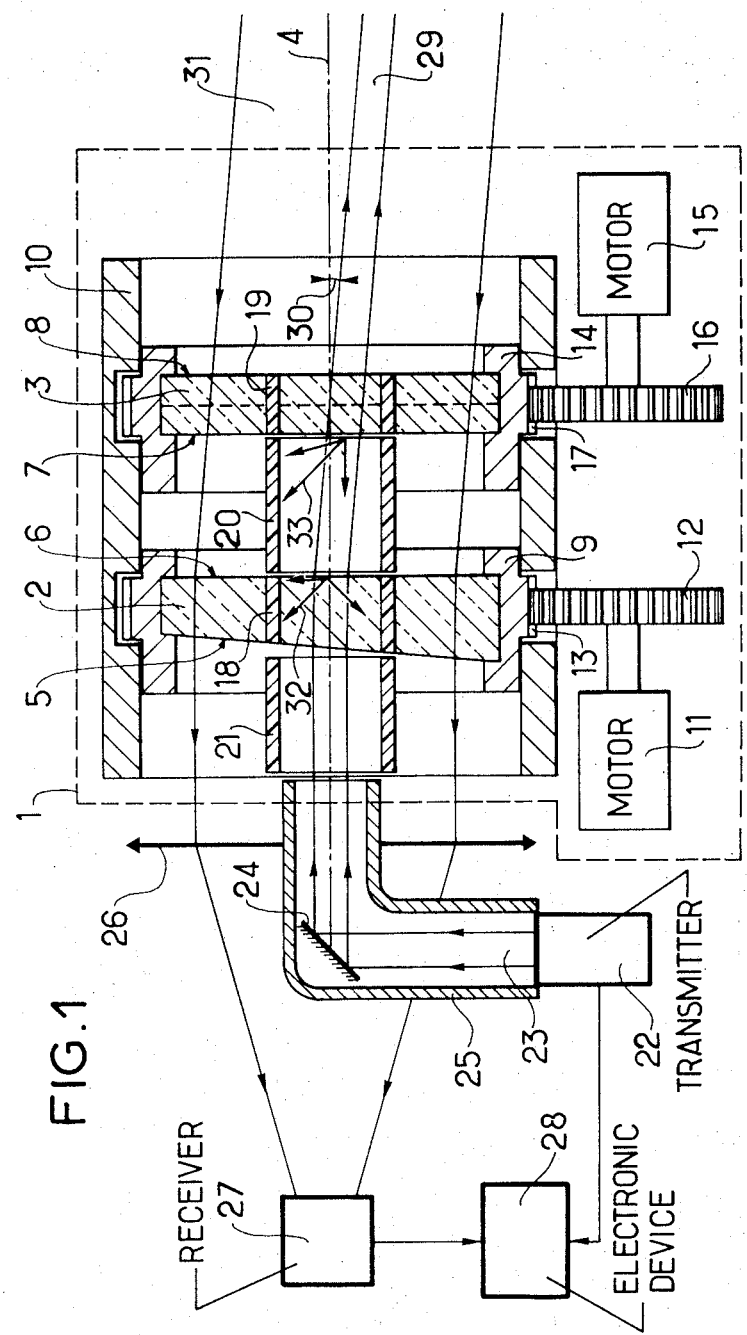

United States Patent [19]
Ripart

[11] 3,827,787
[45] Aug. 6, 1974

[54] ARRANGEMENT FOR ELIMINATING INTERFERENCE REFLECTIONS IN A LIGHT DEVIATING DEVICE

[75] Inventor: Guy Ripart, Le Plessis Robinson, France

[73] Assignee: Compagnie Generale D'Electricite, Paris, France

[22] Filed: Jan. 22, 1973

[21] Appl. No.: 325,681

[30] Foreign Application Priority Data
Jan. 21, 1972  France .............................. 72.02086

[52] U.S. Cl. ....................... 350/285, 350/287, 350/6
[51] Int. Cl. ................................................ G02f 1/34
[58] Field of Search ........... 350/285, 286, 287, 170, 350/320, 6, 7, 203, 213

[56] References Cited
UNITED STATES PATENTS
2,504,383   4/1950   Boawers .............................. 350/205

| | | |
|---|---|---|
| 3,297,395 | 1/1967 | Dardarian .......................... 350/285 |
| 3,347,651 | 10/1967 | Lueck .................................... 35/205 |
| 3,397,023 | 8/1968 | Land .................................... 50/205 |
| 3,510,195 | 5/1970 | Noble .................................. 350/286 |

*Primary Examiner*—Ronald L. Wibert
*Assistant Examiner*—Michael J. Tokar
*Attorney, Agent, or Firm*—Sughrue, Rothwell, Mion, Zinn & Macpeak

[57] ABSTRACT

Device for deviating light comprising two optical prisms driven in a rotating movement about a same axis, each of these prisms having an opaque sleeve crossing it from one face to the other and surrounding the rotating axis, and a method for producing prisms for the deviating device, consisting more particularly in positioning an opaque substance in a cylindrical groove formed in a transparent plate, and in dividing the plate in two parts along a transversal plane.

6 Claims, 3 Drawing Figures

ARRANGEMENT FOR ELIMINATING INTERFERENCE REFLECTIONS IN A LIGHT DEVIATING DEVICE

The present invention concerns devices for deviating light, more particularly devices for deviating light intended to be connected with an optical telemeter. The present invention also concerns methods for producing these deviators.

An optical telemeter comprises an emitter capable of sending a light pulse, a photosensitive receiver capable of detecting an echo of that pulse on a target and an electronic device connected to the emitter and to the receiver enabling the time separating the starting out of the pulse from the receiving of the echo on the receiver to be measured. That time is proportional to the distance between the telemeter and the target. on When the target is mobile in relation to the telemeter, it is an advantage to connect, with the telemeter, a device enabling the target to be lit up, whatever its position may be, and the returning echo to be detected, without modifying the direction of the telemeter. This device may be constituted by a device for deviating the light, comprising two optical prisms placed before the emitter and the receiver of the telemeter, each of these prisms possibly being driven in a rotating movement about a same axis crossing through the faces of these prisms and substantially parallel to the axis of emission of the telemeter. These devices are known by technicians under the name of diasporameter.

When such a deviating device is arranged at the output of a telemeter, there is a great disadvantage. Indeed, the light pulse sent out by the emitter undergoes, on the faces of the prisms through which it crosses, interference reflections which may make an impression on the sensitive surface of the receiver. The latter then sends out interference electric pulses which may saturate the electronic device and seriously disturb the operation. In certain cases, the power of the interference reflections may be sufficiently great to cause the destruction of the photosensitive receiver.

The aim of the present invention is to overcome that disadvantage.

The present invention has for its object a device for deviating light, comprising two optical prisms and means for driving the said prisms in a rotating movement about a same axis crossing through the faces of each of the said prisms, characterised in that each of the said prisms comprises a sleeve crossing through it from one face to the other and surrounding the said axis, at least one part of the wall of the said sleeve being made of a substance opaque to the said light.

The present invention also has for its object a method for producing the two prisms of the said device for deviating light, characterised in that it consists in cutting out an element in a plate of transparent substance having plane faces, then replacing the said element in the cut out plate at the place it occupied before cutting out, then arranging an opaque substance in at least a part of the space comprised between the replaced element and the said cut out plate, and lastly, dividing into two parts the assembly constituted by the said cut out plate, the said opaque substance and the said element in a transversal plane in relation to the planes of the said plane faces, each of the said parts constituting respectively each of the said prisms of the said device for deviating light.

Figure 2:
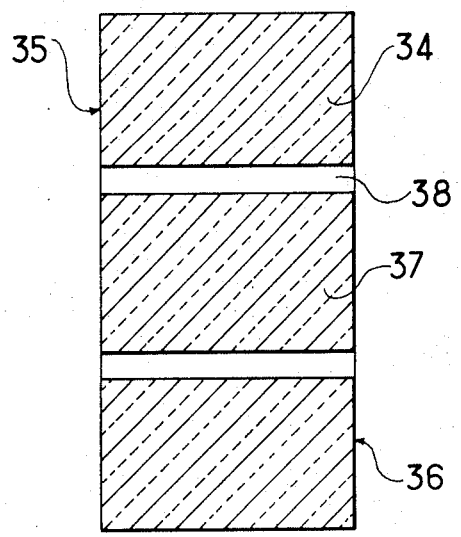
Figure 3:
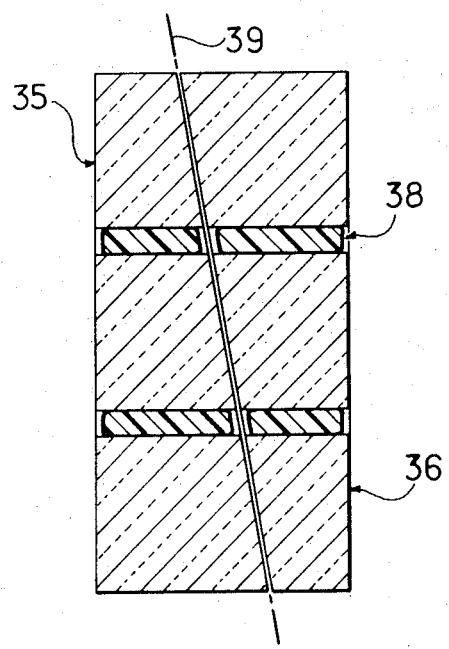

The invention will be better understood from the following description given with reference to the accompanying drawing by way of illustration but having no limiting character, in which FIG. 1 shows a longitudional cross-section view of an example of embodiment of the device according to the invention, and FIGS. 2 and 3 show two phases in the method according to the invention.

FIG. 1 shows a device 1 for deviating light according to the invention, connected with an optical telemeter.

The device 1 comprises two optical prisms 2 and 3 and a device for driving each of these prisms in a rotating movement about a same axis 4 crossing through the faces 5 and 6 of the prism 2 and 7 and 8 of the prism 3.

That drive device comprises, for example, as shown in the figure, a mounting frame 9 in which is arranged the prism 2, capable of rotating about the axis 4, in a fixed housing 10 and a motor 11 driving a pinion 12 which comes into gear with a cog wheel 13 fixed to the mounting frame 9. That drive device comprises, likewise, a mounting frame 14 in which is arranged the prism 3, capable of rotating about the same axis 4 in the housing 10 and a motor 15 driving a pinion 16 which comes into gear with a cog wheel 17 fixed to the mounting frame 14. The prisms 2 and 3 comprise, respectively, sleeves 18 and 19 surrounding the axis 4, these sleeves being preferably cylindrical and having a substantially circular cross-section about that axis. The walls of the sleeves 18 and 19 are made of a substance which is opaque to the light deviated by the device 1.

The device 1 also comprises a screen 20 surrounding the axis 4, made of an opaque substance and arranged substantially in the extension of the sleeves 18 and 19 between the prisms 2 and 3. That screen 20 is preferably cylindrical, with a substantially circular cross-section about the axis 4. The device 1 may also comprise, as shown in the figure, a screen 21 which is absolutely analogous to the screen 20, situated in the extension of the sleeves 18 and 19 on the other side of the prism 2 in relation to the screen 20.

The optical telemeter connected with the deviating device 1 comprises an emitter 22 such as, for example, a laser generator emitting a light pulse 23 reflected on a reflector 24, parallel to an axis which is substantially coincident with the axis 4. The optical path of the pulse 23 is canalized, between the emitter 22 and the device 1, in a conduit 25 made of a substance which is opaque to the light sent out by an emitter 22. That optical telemeter also comprises an optical receiving system 26 diagrammatically illustrated on the figure by a lens, that lens having a hole enabling the conduit 25 to be slid through that lens. The optical system 26 is centered on the axis 4 and is arranged close to the device 1, facing the surface 5 of the prism 2. A photosensitive receiver 27 which may, for example, be an avalanche type photo-diode, is arranged at the focal point of the optical system 26. The receiver 27 and the emitter 22 are connected to an electronic device 28 which may comprise a clock and a digit display device indicating the distance measured by the telemeter.

The device shown in FIG. 1 operates in the following manner:

The light pulse 23 directed along the axis 4, after reflecting on the mirror 24, is deviated, after having crossed through the prisms 2 and 3, in a beam 29 forming an angle 30 with the axis 4.

That angle of deviation 30 depends, at a given instant, on the relative position of the prisms 2 and 3. That position is dependent on the angular direction of the rotors of the motors 11 and 15.

These motors may be, for example, servo-motors connected to an electronic system, not shown, making it possible to find and follow a mobile target. The echo 31 of the pulse 23 on the target is received on the device 1 parallel with the emitting beam 29, and crosses the prisms 3 and 2 of the device 1, then the optical receiving device 26 of the telemeter, which concentrates it on the sensitive surface of the receiver 27, in the reverse direction. The device 28 makes it possible to measure the time which separates the leaving of the pulse from the emitter 22 from the receiving of the echo 31 on the receiver 27, and to display on a digit display panel, the distance between the telemeter and the target.

When the pulse 23 crosses through the faces of the prisms 2 and 3, interference reflections are formed on the faces of the prisms such as those represented by the arrows 32 and 33, capable, after concentration by the optical system 26, of making an impression on the sensitive surface of the receiver 27. These interference reflections are absorbed at the level of the deviating device 1 by the sleeves 18 and 19 and the screen 20, the duct 25 and the screen 21 make it possible to absorb, in the same way, the interference reflections reaching the level of the optical telemeter.

A method for producing prisms such as 2 and 3 provided respectively with the sleeves 18 and 19 forming a part of the device 1 shown in FIG. 1, consists, firstly, as shown in FIG. 2, in cutting out from a plate 34 having plane faces 35 and 36 made of a transparent substance, shown in a cross-section view in FIG. 2, an element 37 which could be, for example, a cylindrical part having a substantially circular cross-section.

This cutting out may be effected by means of a tool, not shown, comprising a cylindrical part made of metal, for example, and covered with a diamond powder, driven in a rotating movement about its axis. An annular groove 38 forming a cylindrical sleeve in the plate is made. The element 37 is then replaced in the cut out plate, at the place it occupied before the cutting out. An opaque substance which may be constituted, for example, by a cement by means of which the element 37 is again made fast with the cut out plate, is hence fitted into the groove 38 between the replaced element 37 and the cut out plate.

As shown in FIG. 3, the assembly constituted by the cut out plate, the opaque substance and the element 37, in a plane 39, which is transversal in relation to the planes of the faces 35 and 36 of the plate is finally divided into two parts. As shown in the figure, the deposit of opaque substance in the groove 38 is such that no opaque substance is deposited, in the cylindrical sleeve constituted by the groove 38, in the vicinity of the transversal plane 39 and of the faces 35 and 36 of the plate. Indeed, the two parts thus obtained are generally polished at the level of the planes 35, 36 and 39 to constitute, respectively, each of the optical prisms shown in FIG. 1, and the presence of cement at the level of these planes could cause during polishing, an alteration of the optical quality of the polished surfaces in the vicinity of the groove 38.

The deviating device according to the invention therefore has the advantage, when it is connected with an optical telemeter, of preventing interference reflections of the light pulse sent out by the emitter from being detected by the receiver. This deviating device may also, to great advantage, be connected with any optical device comprising a light generator and a photosensitive receiver, such as an optical alinement device, for example.

I claim:

1. In a light deviating device comprising: two side by side optical prisms and means for mounting said prisms for relative rotation about a common axis passing through the faces of said prism for deviating light passing bidirectionally through said prisms, the improvement comprising:

an opaque sleeve extending through each prism from one face to the other and forming an integral part of the same, said sleeves being of similar diameter and being axially aligned and coaxial with the common axis of rotation of said prism and defining in each prism, a light sealed central zone crossed by said axis and surrounded by said sleeve and a peripheral zone outside said sleeve for isolating the light passing through said prism bi-directionally, and each of the faces of said prisms being continuously plane from said central zone through said peripheral zone.

2. The device according to claim 1, further comprising: an opaque sleeve extending between prisms of similar diameter to the sleeve of said prism and axially aligned therewith.

3. The device according to claim 1, wherein each sleeve is cylindrical, having a substantially circular cross-section about said axis.

4. The device according to claim 2, wherein each sleeve is cylindrical, having a substantially circular cross-section about said axis.

5. The device according to claim 1, wherein the edges of said sleeves carried by said prisms are recessed a slight distance from the prism faces.

6. The device according to claim 2, wherein the edges of said sleeves carried by said prisms are recessed a slight distance from the prism faces.

* * * * *